June 17, 1969 L. H. GOING ET AL 3,450,727
CONTINUOUS SOLVENT WINTERIZATION OF PARTIALLY HYDROGENATED SOYBEAN OIL
Filed June 29, 1965
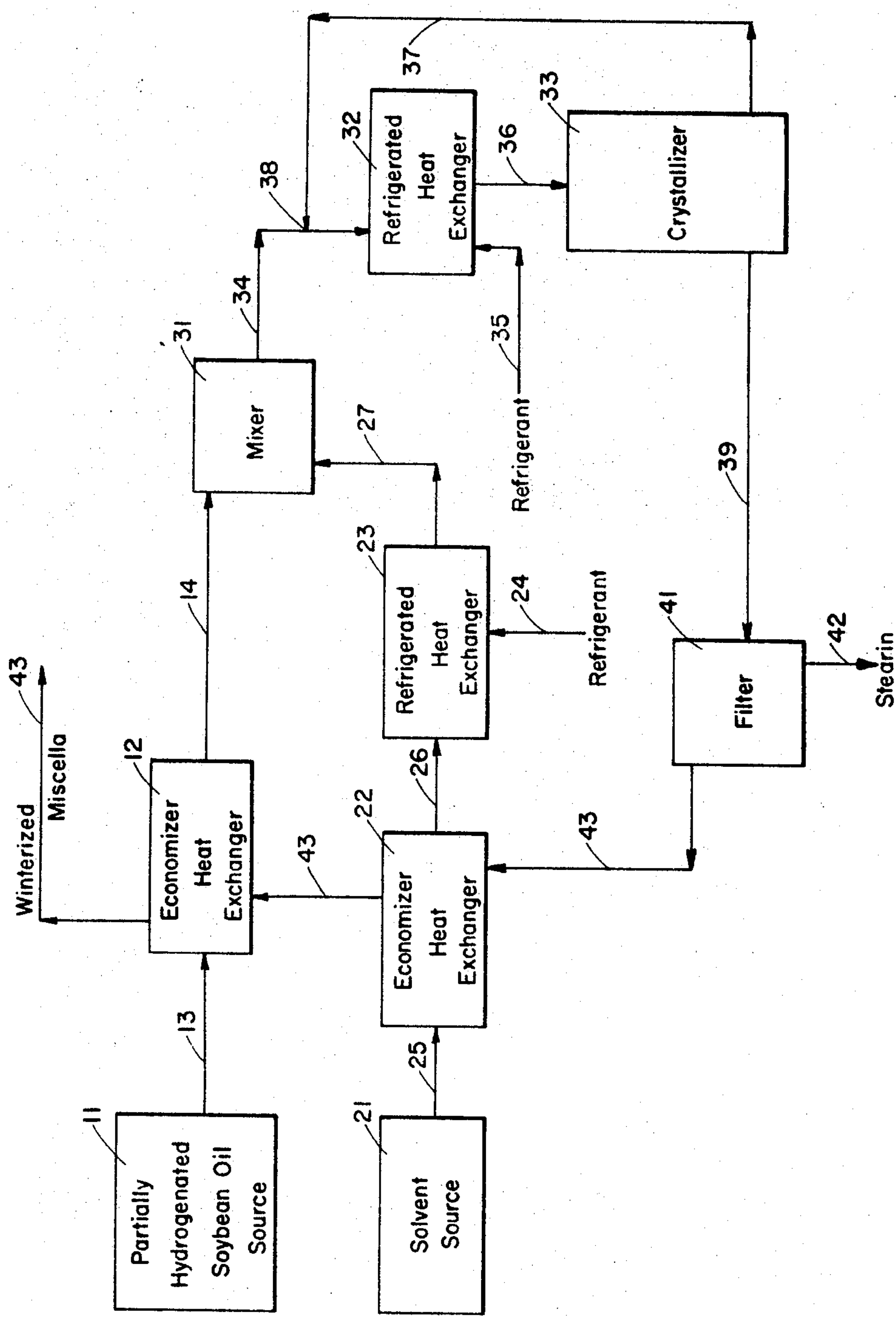
INVENTORS
Louis H. Going
Robert E. Mersfelder
Robert O. Schmitt
BY [signature]
ATTORNEY United States Patent Office 3,450,727

Patented June 17, 1969

3,450,727

CONTINUOUS SOLVENT WINTERIZATION OF PARTIALLY HYDROGENATED SOYBEAN OIL

Louis H. Going, Deerfield Township, Warren County, Robert E. Mersfelder, Springfield Township, Hamilton County, and Robert O. Schmitt, Wyoming, Ohio, assignors to The Procter & Gamble Company, Cincinnati, Ohio, a corporation of Ohio Filed June 29, 1965, Ser. No. 467,920
Int. Cl. C11b 7/00
U.S. Cl. 260—428.5 11 Claims

ABSTRACT OF THE DISCLOSURE

A continuous process for fractionating partially hydrogenated soybean oil to remove high melting fatty glycerides therefrom which comprises forming a miscella of partially hydrogenated soybean oil in an oil solvent; adding high melting fatty glyceride seed crystals to the miscella when the temperature of the miscella is between 30° F. and 45° F. in an amount from about 0.5% to about 3% by weight of the partially hydrogenated soybean oil in the miscella; immediately thereafter rapidly continuously chilling the seeded miscella at a cooling rate of about 5° F. to about 15° F. per minute to a temperature below the crystallization temperature of the high melting fatty glycerides in the seeded miscella to permit the high melting fatty glycerides to crystallize in solid form; maintaining the miscella at the crystallization temperature of the high melting fatty glycerides for a period of time to induce complete crystallization; and, separating the miscella and crystallized solids.

This invention relates to a continuous process for separating partially hydrogenated soybean oil into fractions having different melting points, and, more particularly, to a method for crystallizing and separating high melting glycerides or "stearin" from partially hydrogenated soybean oil by continuous fractionation of the oil in a suitable solvent. This invention is specifically directed to a continuous process for winterizing partially hydrogenated soybean oil in miscella form to produce an olein oil fraction that can be processed into a clear salad oil which will remain transparent at normally encountered temperatures.

Substantial quantities of liquid vegetable glyceride oils, particularly cottonseed oil, soybean oil, corn oil and safflower oil are presently utilized for the preparation of salad oils. Salad oils have a number of common uses: they are used to prepare liquid salad dressing; they are used for certain baking and frying purposes; and, they are used to prepare mayonnaise emulsions.

Salad oils and mayonnaise emulsions are frequently refrigerated at temperatures of about 40° F. and below. During shipping from the manufacturer to the market place, these products are often exposed to temperatures which are substantially lower than the temperatures encountered in ordinary refrigeration. At these cold temperatures, that is, at temperatures below about 40° F., the insoluble fatty and waxy materials in the salad oils tend to deposit from the oil in the form of small crystals or particles. These materials cause the oil to have a cloudy or opaque appearance. The formation of small crystalline particles in mayonnaise emulsions tends to break the emulsion and cause the salad oil portion of the emulsion and the water phase to separate.

The crystals that form in salad oils at low temperatures are primarily saturated fatty glycerides or stearins which have higher melting temperatures than the balance of the oil. These stearins are generally saturated fatty triglycerides but they can include other solid crystalline materials such as solid mono- and diglycerides and certain partially saturated fatty triglycerides. The particulate materials which separate from salad oils at cold temperatures are primarily waxes, but they also include gums, phospholipids and the like. Stearin crystals and waxy particles must be removed from edible oils before the oils are suitable salad oils.

The resistance of edible oils to clouding at cold temperatures is measured by a standardized and well known "chill test" (Official Method Cc 11–53 of the American Oil chemists' Society). According to this procedure, an oil which is free from clouding for 5½ hours at 32° F. is a suitable salad oil.

The tendency of liquid glyceride oils to deposit crystals of solid fatty materials and particles of other substances such as waxes at low temperatures can be corrected or alleviated by a process commonly referred to as "winterization." Winterizing an oil consists of removing that portion of the oil which tends to crystallize or separate out of the oil at low temperatures. Classically, this process was conducted out of doors during the winter months. The outside temperature cooled the oil and the solid fatty materials and other substances deposited out of the oil; thereafter, the clear oil or olein fraction was taken off of the top of the deposited materials or stearins and used as salad oil. The classic process of winterizing an oil had many apparent limitations, not the least of which was its seasonal temperature requirements.

In order to provide large quantities of winterized oils suitable for salad oils, it became necessary to improve upon the classic method of winterizing an oil by adding artificial refrigeration and mechanical filtering processes to separate the materials which were deposited at low temperatures from the oil. Many of these improved processes are still in use today; they are primarily batch operations conducted in large tanks in refrigerated cooling rooms. The tanks themselves are generally equipped with brine cooling coils which permit greater control over the rate of cooling in the tanks. The formation of filterable solids in these batch processing tanks generally requires about 72 hours to complete. No commercially practical winterizing process which could be completed in less time than about 72 hours was known until the advent of certain continuous winterizing techniques involving the use of specially designed equipment and the critical control of temperatures at all stages of the processing of the oil.

Continuous winterization processes now make it possible to winterize certain natural oils in relatively short periods of time, say one to two hours. By way of example, Cavanaugh, U.S. Patent 2,883,405 granted Apr. 21, 1959, discloses a method for continuously winterizing cottonseed oil by solvent fractional crystallization. In practice, the Cavanaugh process requires, in part, a specially designed cooling tower; it further requires observance of specific temperature requirements throughout the processing of the oil including a maximum cooling rate which does not exceed 0.5° F. per minute.

In large measure, improved winterizing processes have been designed primarily for cottonseed oil since other natural oils such as soybean oil, corn oil and safflower oil do not ordinarily require winterization to insure clarity. These other oils contain only small amounts of certain waxy substances which must be removed before the oils will remain clear at low temperatures. Since waxy materials are much more easily filtered from an oil than are crystals of fatty glycerides, it has always been possible to more quickly chill these other natural oils and filter out the particles of waxy materials than it has been to winterize oils such as cottonseed oil to remove stearin crystals.

In commercial practice, the oxidative stability of certain natural oils, particularly soybean oil, must be increased before the oil can be used to prepare salad oils; otherwise, the bland taste of the oil tends to deteriorate. This is generally accomplished by partially hydrogenating the natural oil. While hydrogenating an oil such as soybean oil stabilizes it against oxidative deterioration, it also increases the melting point of certain fatty glyceride components making them less soluble in the oil. These components must be removed from the oil for the same reason that such solids are removed from certain natural oils such as cottonseed oil in order to insure that the oil remains clear at low temperatures. Thus, the problem of winterizing partially hydrogenated oil such as partially hydrogenated soybean oil includes producing fatty glyceride crystals of the proper size and form so that they may be readily separated from the oil along with the waxy materials.

Producing filterable fatty glyceride crystals in a winterization process has always been a matter of great difficulty. Heretofore it has required inordinate lengths of time, specially designed equipment, and/or the careful control of certain temperatures, particularly the maximum cooling rate, which in the most rapid continuous process heretofore disclosed has not exceeded about 0.5° F. per minute. It would be eminently desirable to have a fractional crystallization process primarily designed to fractionate partially hydrogenated oil, particularly partially hydrogenated soybean oil, which could be carried out at a cooling rate in excess of 0.5° F. per minute to produce easily separated solid and liquid phases. To be most suitable for commercial use such a process should ideally utilize rapid continuous chilling but should not require specially designed equipment which may be difficult to either build or operate.

Accordingly, it is a principal object of this invention to provide a process for winterizing partially hydrogenated soybean oil using conventional equipment in a rapid continuous fashion at a cooling rate greatly exceeding 0.5° per minute to produce easily filterable stearin crystals and an olein fraction which can be processed into a clear salad oil.

It is a further object of this invention to provide a continuous process for fractionating partially hydrogenated soybean oil in the presence of a solvent while the oil is in miscella form to remove fatty glyceride solids and waxy materials from the oil.

It is a still further object of this invention to winterize partially hydrogenated soybean oil in the form of a miscella by rapidly continuously chilling the miscella at a cooling rate of about 5° F. to about 15° F. per minute in conventional chilling equipment to induce crystallization of stearin materials which can be readily separated from the miscella without entraining substantial quantities of oil.

Another object of this invention is to reduce the equipment and refrigeration costs of winterizing partially hydrogenated soybean oil while decreasing the time required to treat the oil.

Still another object of this invention is to provide an improved continuous process for treating partially hydrogenated soybean oil in a single crystallization step to effect a relatively sharp separation of oil and readily filterable solids.

Other objects and advantages of the invention will be apparent from the description of the present process which follows and from reference to the accompanying drawing. The drawing is a schematic flow diagram illustrating the continuous winterization process of this invention.

Briefly, the process of this invention includes the steps of forming a miscella of partially hydrogenated soybean oil in an oil solvent, adding a small amount of high melting fatty glyceride seed crystals to the miscella at a critical miscella temperature, rapidly continuously chilling the seeded miscella at a cooling rate of about 5° F. to about 15° F. per minute to a temperature below the crystallization temperature of the high melting fatty glycerides in the miscella to permit the high melting fatty glycerides to crystallize in solid form, maintaining the miscella at the crystallization temperature for a period of time to induce complete crystallization, and thereafter separating the miscella and crystallized solids. Waxy materials and other unwanted solid substances are also removed from the oil along with the fatty glyceride crystals.

The soybean oil which is winterized in the present process is first partially hydrogenated. Natural soybean oil has an iodine value (I.V.) which may vary between about 110 and 150 with the average I.V. being about 130. As previously explained, natural soybean oil must be partially hydrogenated to guard against flavor deterioration when the oil is exposed to air or high temperatures. In the present process it is preferred to use an oil which has been hydrogenated to an I.V. of about 97 to about 113, most preferably to about 105.

The partial hydrogenation of natural soybean oil can be accomplished by any one of a number of well known processes, all of which involve contacting the oil with gaseous hydrogen in the presence of a hydrogenation catalyst or promoter. The method by which the soybean oil which is treated in the present process is hydrogenated forms no part of the present invention.

While this invention is specifically directed to winterizing partially hydrogenated soybean oil, it can be adapted for processing other liquid vegetable glyceride oils such as cottonseed oil. The present process is particularly well suited for winterizing partially hydrogenated soybean oil and it will be further described in terms of its applicability to treating such an oil.

The miscella of partially hydrogenated soybean oil and solvent which is formed by intermixing these two components in the present process comprises from about 25% to about 80% by weight oil. The oil is dissolved in a suitable solvent which has a boiling point well above the freezing point of both the fatty glyceride solids and waxy materials in the oil and a freezing point which is below the freezing point of these materials. Normal hexane is the preferred solvent; other suitable solvents include acetone, propane, butane, pentane, heptane, petroleum naphthas, and mixtures of petroleum naphthas with other oil solvents. The amount of oil dissolved in the solvent is dependent in part on the desired viscosity of the miscella at or above the crystallization temperature of the solid fatty triglycerides in the oil. The more solvent which is used the lower the viscosity of the miscella at low temperatures. Since the solvent must be ultimately removed from the oil, it is neither practical nor desirable to use excessive amounts of solvent. In the case of very volatile solvents excessive amounts of solvent unduly increase the hazards attendant to operation of the process. It has been found that about a 65% concentration of oil in a solvent such as normal hexane keeps the viscosity of the miscella in bounds, permits rapid continuous chilling of the miscilla to produce easily filterable solids, and permits easy and complete separation of the solvent from the miscella.

Referring specifically to the drawing, the partially hydrogenated soybean oil to be winterized is retained in a storage tank or supply reservoir 11 in sufficient quantity to insure an adequate continuous supply of oil to the processing system. The oil storage tank or supply reservoir can be dispensed with when a direct and continuous supply of partially hydrogenated oil is readily available;

for example, when the partially hydrogenated soybean oil is continuously supplied from an adjoined hydrogenation process or when it is drawn directly from a railroad tank car which is in effect an oil storage tank or supply reservoir but is not a permanent installation.

The partially hydrogenated soybean oil is drawn or pumped from its supply source via pipeline 13 to an economizer heat exchanger 12. Economizer heat exchangers or "economizers" are well known pieces of conventional cooling equipment. The heat which is removed from the partially hydrogenated soybean oil in economizer 12 is used to warm the winterized miscella of oil and solvent, the product of the instant process, as more fully explained hereinafter. The partially hydrogenated soybean oil which passes through economizer 12 and leaves the economizer by pipeline 14 is cooled to a temperature of about 50° F. to about 55° F.

Solvent is stored in a storage tank or supply reservoir 21. It is drawn or pumped through pipeline 25 to an economizer 22 wherein the temperature of the solvent is reduced to about 20° F. to about 35° F. The heat which is removed from the solvent in economizer 22 is also used to warm the winterized miscella. The temperature of the solvent is further reduced to about —5° F. to about 15° F. in a refrigerated heat exchanger 23, cooled with Freon or other suitable refrigerant from source 24, by conveying the solvent from economizer 22 to refrigerated heat exchanger 23 via pipeline 26.

It is apparent that economizers 12 and 22 can be replaced by refrigerated heat exchangers. If economizer 22 is eliminated, only one refrigerated heat exchanger is required to cool the solvent provided the refrigerated heat exchanger has a capacity sufficient to cool the solvent to the required temperature of about —5° F. to about 15° F. The economizers are illustrated in the drawing and described herein because they have been found to be economical to operate in the actual practice of the present process wherein the cooling requirements for the oil and the solvent can be partially met by warming the winterized miscella product.

The cooled oil and solvent entering mixer 31 through pipelines 14 and 27, respectively, are admixed to form a miscella of oil and solvent; the miscella is exhausted from the mixer through pipeline 34. By virtue of the precooling of the oil and solvent to the temperatures set forth above, the miscella leaving the mixer has a temperature of about 30° F. to about 45° F.

Mixer 31 can be any suitable in line mixer capable of thoroughly intermixing the hydrogenated soybean oil and solvent without significantly increasing the temperature of the miscella. A conventional high-shear mixer composed of one or more turbine blade agitators enclosed in a suitable housing has been found to be satisfactory. Other suitable mixers are well known in the art and need not be described herein any detail.

It is readily apparent that the temperature of the miscella coming from mixer 31 is a function of the individual temperatures of the partially hydrogenated soybean oil and solvent entering the mixer as well as a function of the proportion in which the partially hydrogenated soybean oil and the solvent are combined. For reasons which are fully explained hereinafter the temperature of the miscella in pipeline 34 is critical to the proper operation of the process; therefore, the temperature of the hydrogenated soybean oil, the temperature of the solvent, and the proportions of oil in solvent must be regulated to the degree necessary to insure that the miscella leaving mixer 31 has a certain predetermined temperature. This temperature which is between about 30° F. and about 45° F. must be in excess of the cloud point of the miscella but it must not ordinarily exceed the cloud point by more than about 5° F. The cloud point of the miscella is defined as the temperature at which the crystals of high melting fatty glycerides begin to form instantaneously. In other words, the temperature of the miscella must not exceed by more than about 5° F. the melting point temperature in situ of the high melting fatty glycerides which are to be removed from the partially hydrogenated soybean oil.

At point 38 in pipeline 34 immediately preceding refrigerated heat exchanger 32, seed crystals of high melting fatty glycerides are added to the miscella. These seeds can come from any source but preferably they are seed crystals taken from crystallizer 33 and returned to point 38 via pipeline 37. The seed crystals which are continuously fed into the miscella in pipeline 34 at point 38 provide nuclei for the growth of stearin crystals. These seed crystals constitute about 0.5% to about 3% by weight of the partially hydrogenated soybean oil passing through pipeline 34. When taken from crystallizer 33, the temperature of the seed crystals is about 15° F. to about 50° F. below the temperature of the miscella in pipeline 34. In order to avoid melting the crystals after their addition to the miscella and thereby negating their usefulness, the seed crystals must be added to the miscella immediately before it is rapidly continuously chilled in refrigerated heat exchanger 32.

In the actual operation of the continuous process depicted in the drawing, the seed crystals of high melting fatty glycerides which are fed into pipeline 34 at point 38 are seed crystals in miscella form since these seed crystals are taken from the outlet end of crystallizer 33. Although the amount of seed crystals which is added to the miscella in pipeline 34 at point 38 is determined on the basis of the amount of the seed crystals per se based on the weight of the oil in the miscella in pipeline 34, it is convenient to express the quantity of seed crystals in terms of the quantity of crystallized miscella which is taken from the outlet end of crystallizer 33 and returned via pipeline 37 to point 38 in pipeline 34. This quantity of crystallized miscella which is recycled from crystallizer 33 back through refrigerated heat exchanger 32 with the miscella in pipeline 34 is about 5% to about 30% by weight of the miscella passing through crystallizer 33.

When operation of the present process is commenced, seed crystals of high melting fatty glycerides in miscella form are not available from crystallizer 33. Until the process has been in operation for a sufficient length of time to supply its own seed crystals, seed crystals are added to the miscella at point 38 in line 34 from an extraneous source not shown in the drawing. These seed crystals can be either crystals of high melting fatty glycerides per se, or they can be seed crystals which have been dispersed in a solvent to form a miscella. The solvent is generally the same solvent as the solvent in the miscella being processed. For convenient operation, the temperature of the miscella containing the seed crystals should be about —5° F. to about 15° F.; at this temperature the temperature of the seed crystals is about 15° F. to about 50° F. below the temperature of the miscella in pipeline 34. It will be apparent that the required temperature of the seed crystals is a function of their type as well as the amount of seed crystals dispersed in the solvent, if any, to form a miscella. It is essential that the temperature of the seed crystals be below the temperature of the miscella in pipeline 34 and sufficiently low to keep the crystals from melting before the seeded miscella in pipeline 34 is cooled in refrigerated heat exchanger 32.

Immediately after seeding the miscella in pipeline 34 with crystals of high melting fatty glycerides, the seeded miscella is rapidly continuously chilled in refrigerated heat exchanger 32 supplied with refrigerant from source 35 at a continuous rapid chilling rate of about 5° F. per minute to about 15° F. per minute to a temperature which is below the crystallization temperature of the high melting fatty glycerides in the miscella. The temperature to which the miscella is chilled in refrigerated heat exchanger 32 is below the crystallization temperature of the high melting fatty glycerides in the miscella to allow for the ultimate rise in temperature of the miscella due to heat of crystallization. The temperature to which the miscella is rapidly continuously chilled in refrigerated heat exchanger 32 is about −5° F. to about 5° F.; this temperature is from about 5° F. to about 20° F. below the actual crystallization temperature of the high melting fatty glycerides in the miscella.

When the required temperature of the seeded miscella is obtained in refrigerated heat exchanger 32, the chilled miscella is conveyed via pipeline 36 to a conventional crystallizer 33 where the seeded and chilled miscella is maintained below or at the crystallization temperature of the high melting fatty glycerides in the miscella for a time which is sufficient to form these high melting fatty glycerides into solids. This time can range from about 40 minutes to about 120 minutes, depending upon the amount of high melting fatty glyceride seeds added to the miscella prior to rapid continuous chilling of the miscella, the rapidity of continuous chilling of the seeded miscella in refrigerated heat exchanger 32 and the final temperature of the seeded miscella when it enters crystallizer 33.

After sufficient time for the development of the high melting fatty glyceride solids or stearin crystals has elapsed, the miscella is withdrawn from crystallizer 33 through pipeline 39 and conveyed to a conventional rotary vacuum filter 41. The stearin crystals along with a portion of the solvent are separated from the miscella in a rotary vacuum filter 41 and drawn off from the filter via pipeline 42. The winterized miscella or olein fraction which is free of stearin crystals is withdrawn from the rotary vacuum filter through pipeline 43. As previously mentioned and as shown in the drawing, the winterized miscella in pipeline 43 is passed through economizer heat exchangers 22 and 12 where it is warmed by the heat removed from the solvent and the partially hydrogenated soybean oil, respectively.

A rotary vacuum filter has been found to be particularly well suited for the continuous filtration of the stearin crystals which are formed by the present process. Other conventional pieces of filtering equipment possessing the capacity and efficiency of a rotary vacuum filter can also be used. Suitable filtering equipment is well known in the art and is fully described in Perry's Chemical Engineering Handbook (3d ed.) pp. 976–983.

The stearin and olein fractions separated in rotary vacuum filter 41 are subjected to further treatment to recover the solvent and, in the case of the olein fraction, to prepare it into a commercially acceptable salad oil.

Stripping the solvent from the olein and stearin fractions which are separated in the rotary vacuum filter 41 is a conventional practice and is not illustrated in the drawing; it does not need to be fully described. A typical and illustrative method suitable for stripping solvent, for example, from the stearin crystals comprises melting the crystals and merely evaporating the solvent. If necessary, solvent entrained with the stearin particles can be flash evaporated in a flashing chamber to obtain a complete separation. In the present process, the solvent can generally be merely evaporated and stripped from both the stearin and olein fractions. The solvent which is stripped from the stearin and olein fractions is returned to storage tank or supply reservoir 21 for subsequent re-use in the process.

The schematic diagram shown in the drawing is illustrative only. For reasons of clarity and conciseness, certain pumps, metering equipment and tanks have not been described. The use of these pieces of equipment and other similar apparatus will be readily understood by those skilled in the art since their uses are, in large measure, common to process engineering.

The process of this invention and the operation of a continuous system such as the system schematically described above and illustrated in the drawing is further illustrated by the following example disclosing the general operating requirements for producing 10,000 pounds of winterized hydrogenated soybean oil in each hour of operating time. The system which is described has been in operation for a length of time sufficient that the seed crystals of high melting fatty glycerides can be supplied from the system itself.

Twelve thousand five hundred pounds of refined, bleached, and partially hydrogenated soybean oil having an I.V. of 107 is delivered from a hydrogenating plant to a storage tank equipped with an agitator. The oil storage tank is provided with a heating unit consisting of coils for conveying hot water uniformly about the perimeter of the tank. The oil is maintained in the storage tank at a temperature of about 130° F. At this temperature, the oil has a viscosity of about 18 centipoise and a specific gravity of 0.9. The oil is continuously withdrawn from the storage tank by an oil pump and pumped through an economizer heat exchanger where it is cooled to about 50° F.

Normal hexane which has been stored in a storage tank at a maximum temperature of 95° F. is continuously pumped from the tank, and 6750 pounds is cooled to about 0° F. by passing it through an economizer heat exchanger and subsequently through a refrigerated heat exchanger. At 90° F. the normal hexane in the storage tank has a viscosity of 0.3 centipoise and a specific gravity of 0.67; the cooled normal hexane has a viscosity of 0.5 centipoise and a specific gravity of 0.71.

The cooled, partially hydrogenated soybean oil and the chilled normal hexane are continuously intermixed in an inline mixer to form a miscella composed of 65% by weight oil and the balance solvent. The miscella as it leaves the mixer has a temperature of about 40° F. and a viscosity of about 8.0 centipoise. The miscella is then seeded with 1% stearin crystals by weight of the oil in the miscella. The stearin crystals are taken from the crystallizer which is located downstream in the process. The seed crystals added to the miscella of partially hydrogenated soybean oil and solvent are in miscella form; the miscella containing the seed is about 10% by weight of the partially hydrogenated soybean oil and solvent which is being processed. Immediately after seeding, the seeded miscella is delivered to a refrigerated heat exchanger and rapidly chilled at a rate of 9° F. per minute at a maximum Reynolds number of 300 to about 0° F. The viscosity of the chilled miscella emerging from the refrigerated heat exchanger is about 15 centipoise; its specific gravity is 0.85.

After chilling, the miscella is fed into the top of a conventional agitated gravitational crystallizer having a column length which is about 12 times the diameter of the column. The miscella is held in the crystallizer for about 90 minutes and then withdrawn. The chilled and crystallized miscella is pumped from the crystallizer to a conventional rotary vacuum filter except for that portion of the chilled and crystallized miscella which is used to seed the stream of newly formed miscella of hydrogenated soybean oil and solvent. The rotary vacuum filter is of a conventional continuous filter belt design. One-third of the continuous filter belt is immersed in crystallized miscella; two-thirds of the belt is used for drying and vacuum release. Eight hundred pounds of chilled normal hexane having a temperature of about 0° F. is continuously sprayed on the filter belt in order to wash the filter cloth comprising the belt and keep it from clogging. The solvent used for this purpose is taken from the normal hexane source used to compose the miscella of partially hydrogenated soybean oil. The drum in the rotary vacuum filter is rotated at a speed of 0.5 r.p.m. and filtering is carried out under a vacuum of 15 inches of mercury. In addition to the 800 pounds of normal hexane used to wash the filter cloth, 2560 pounds of normal hexane from the source is used to dilute the stearin fraction separated from the crystallized miscella in the rotary vacuum filter.

Two thousand five hundred pounds of stearin in 5000 pounds of normal hexane is removed by the rotary vacuum filter and stripped of solvent. Ten thousand pounds of olein miscella having a viscosity of 12.5 centipoise and a specific gravity of 0.84 and containing 6290 pounds of normal hexane is delivered from the rotary vacuum filter via a pump to a surge tank. The chilled olein miscella is withdrawn from the surge tank and run through the economizers used to chill the partially hydrogenated soybean oil and normal hexane prior to being stripped of solvent and processed into finished salad oil.

The normal hexane solvent which is recovered from the stearin and the olein miscellas is recovered and recycled in the process.

One of the essential features of the above-described single-stage crystallization process resides in the controlled addition of seed crystals of high melting fatty glycerides to the chilled miscella of partially hydrogenated soybean oil and solvent. The seed crystals which are added to the miscella stimulate further crystal growth; this stimulated growth of crystals allows the miscella to be rapidly continuously chilled at an exceptionally high chilling rate. It eliminates the need to slowly cool the miscella in multiple stages to permit crystal nucleation and growth to occur spontaneously and randomly within the heat exchangers. The separation of the chilling equipment from the equipment in which crystallization of the high melting fatty glycerides occurs avoids the necessity for specially designed equipment; it also eliminates the need for more than one crystallization column.

Varying the amount of high melting fatty glyceride crystals used to seed the miscella of partially hydrogenated soybean oil and solvent in the present process affects the stability of the process, affects the stearin filtration rates which are achieved, and affects the residence time required in the crystallization column. Generally, the greater the amount of seed crystals, the less the residence time of the miscella in the crystallizer, the greater the stability of the process, and, within limits, the lower the filtration rate of the stearin crystals in the rotary vacuum filter. By way of example, Table I below reports the results of varying the amount of high melting fatty glyceride crystals used to seed the chilled miscella of partially hydrogenated soybean oil and normal hexane in the example set forth above. The amount of seed crystals is reported in Column A of Table I in terms of the weight of the seed crystals which were used based on the weight of the oil in the chilled miscella of hydrogenated soybean oil and solvent and, alternatively, for convenience, in Column B based on the percent of crystallized miscella recycled through the crystallizer column. The chilling rate which is reported is the rapid continuous chilling rate of the miscella which immediately follows seeding of the miscella and precedes crystallization.

It will be understood that the foregoing description is by way of illustration only and that it is not intended to unduly restrict or otherwise limit the scope of the persent invention. Changes, omissions, additions, substitutions and/or other modifications not herein specifically described but coming within the claims set forth below are a part of this invention.

What is claimed is:

1. A continuous process for fractionating partially hydrogenated soybean oil to remove high melting fatty glycerides therefrom which comprises forming a miscella of partially hydrogenated soybean oil in an oil solvent; adding high melting fatty glyceride seed crystals to the miscella when the temperature of the miscella is between 30° F. and 45° F. in an amount from about 0.5% to about 3% by weight of the partially hydrogenated soybean oil in the miscella; immediately thereafter rapidly continuously chilling the seeded miscella at a cooling rate of about 5° F. to about 15° F. per minute to a temperature below the crystallization temperature of the high melting fatty glycerides in the seeded miscella to permit the high melting fatty glycerides to crystallize in solid form; maintaining the miscella at the crystallization temperature of the high melting fatty glycerides for a period of time to induce complete crystallization; and, separating the miscella and crystallized solids.

2. The process of claim 1 wherein the miscella of partially hydrogenated soybean oil comprises about 25% to about 80% by weight oil.

3. The process of claim 1 wherein the solvent is normal hexane.

4. The process of claim 1 wherein the temperature of the miscella to which the high melting fatty glyceride seed crystals are added does not exceed the cloud point of the miscella by more than about 5° F.

5. The process of claim 1 wherein the temperature to which the seeded miscella is rapidly continuously chilled is about −5° F. to about 5° F.

6. The process of claim 1 wherein the high melting fatty glyceride seed crystals are seed crystals in miscella form.

7. The process of claim 1 wherein the period of time during which the miscella is maintained at the crystallization temperature of the high melting fatty glycerides is about 40 minutes to about 120 minutes.

8. The process of claim 1 wherein the crystallized solids are separated from the miscella by filtration.

9. A continuous process for fractionating partially hydrogenated soybean oil to remove high melting fatty glycerides therefrom which comprises forming a miscella of partially hydrogenated soybean oil in normal hexane solvent, the amount of oil in the miscella being about 65% by weight of the miscella; adding high melting fatty glyceride seed crystals to the miscella when the temperature of the miscella is between about 30° F. and 45° F., the seed crystals being in miscella form; immediately thereafter rapidly continuously chilling the seeded miscella at a cooling rate of about 5° F. to about 15° F. per minute to about −5° F. to about 5° F. to permit the high melting fatty glycerides to crystallize in solid form; maintaining the miscella in a crystallization column at the crystallization temperature of the high melting fatty

TABLE I

| A | B | Rapid continuous chilling | | Crystallization column | | |
|---|---|---|---|---|---|---|
| Seed crystals, percent by weight | Recycled miscella, percent by weight | Avg. chilling rate, °F./minute | Maximum Reynolds No. | Hold time, minutes | Temp. Rise, ° F. | Stearin filtration rate, lb./hr./$ft.^2$ |
| 0.5 | 5 | 8.4 | 288 | 83.5 | 8.2 | 974 |
| 1 | 10 | 8.4 | 308 | 79.5 | 7.8 | 995 |
| 1.5 | 15 | 9.0 | 317 | 85.0 | 7.8 | 1,011 |
| 2.5 | 25 | 9.0 | 337 | 70.5 | 7.3 | 940 |
| 3 | 30 | ---- | ---- | ---- | ---- | ---- |

Results of the standard chill test previously described on the salad oils produced by the present process exceed 24 hours. These chill test results are susceptible to changes in the temperature of the chilled miscella immediately prior to entering the crystallization column. For example, when the temperature of the chilled miscella entering the crystallization column is from −1° F. to 0° F., the chill test results generally exceed 35 hours; however, when the outlet temperature of the chiller is from about 1° F. to 2° F. the chill test results are generally below 35 hours.

glycerides glycerides for a period of about 40 minutes to about 120 minutes to induce complete crystallization; and, separating the miscella and crystallized solids; the miscella of seed crystals added to the miscella of partially hydrogenated soybean oil and normal hexane being about 5% to about 30% by weight of the miscella passing through the crystallization column.

10. The process of claim 9 wherein the miscella of seed crystals is supplied from the crystallization column.

11. The process of claim 9 wherein the crystallized solids are separated from the miscella by rotary vacuum filtration.

References Cited

UNITED STATES PATENTS 3,235,578 2/1966 Zilch et al. -------- 260—428.5

ALEX MAZEL, *Primary Examiner.*

A. M. TIGHE, *Assistant Examiner.*